G. DE KERLEGAND.
INSECT CATCHER AND DESTROYER.
APPLICATION FILED AUG. 30, 1910.

992,406.

Patented May 16, 1911.

3 SHEETS—SHEET 2.

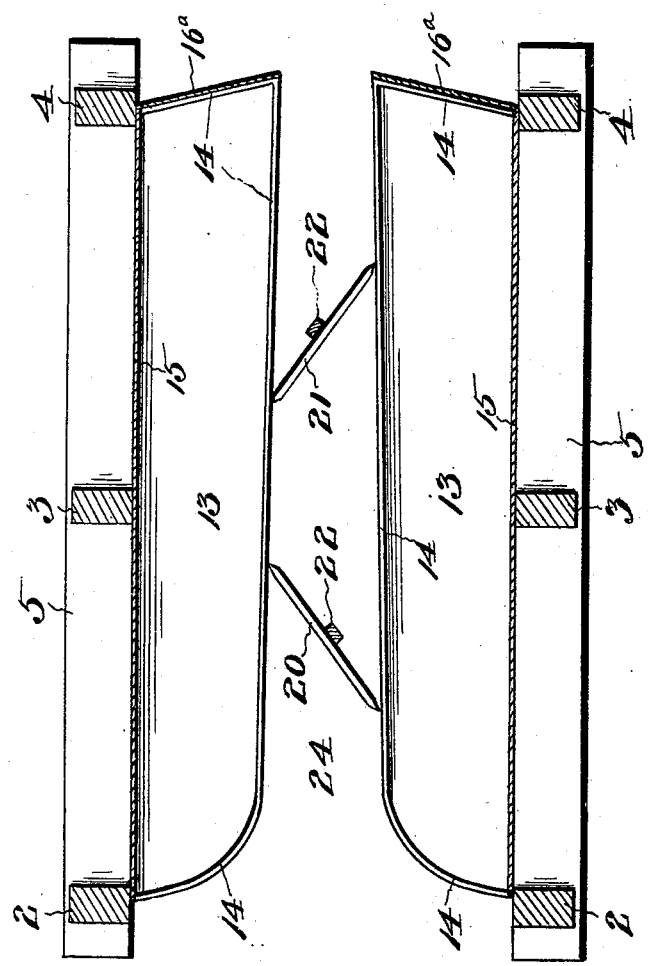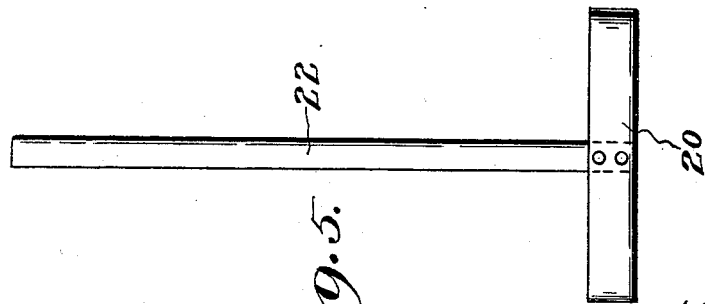

UNITED STATES PATENT OFFICE.

GUERINIERE DE KERLEGAND, OF ARNAUDVILLE, LOUISIANA.

INSECT CATCHER AND DESTROYER.

992,406.   Specification of Letters Patent.   Patented May 16, 1911.

Application filed August 30, 1910. Serial No. 579,697.

*To all whom it may concern:*

Be it known that I, GUERINIERE DE KERLEGAND, a citizen of the United States, residing at Arnaudville, in the parish of St. Landry, State of Louisiana, have invented certain new and useful Improvements in Insect Catchers and Destroyers; and I do declare the following to be a full, clear, and exact description of the invention, such as will enable others skilled in the art to which it pertains to make and use the same.

My invention relates to improvements in insect catchers and destroyers, and more particularly to a device adapted for use in removing the boll weevil from cotton plants.

The object of the invention is to provide means for removing all kinds of insects from growing vegetation of various kinds and to destroy said insects after removal.

It has for a further object to provide a device which can be drawn along over a row of cotton or other plants and which is provided with means which will automatically contact and shake or agitate each plant in such a manner that the boll weevil or other insect thereon will be shaken off and fall into receptacles filled with coal oil or other suitable destroying agent.

It has for a further object to break off the buds which have been damaged by the growing germs or eggs of insects which have been deposited therein.

It has for a still further object to provide a device of the character above mentioned which is very simple, inexpensive and durable in construction and easy and effective in use.

Figure 1:
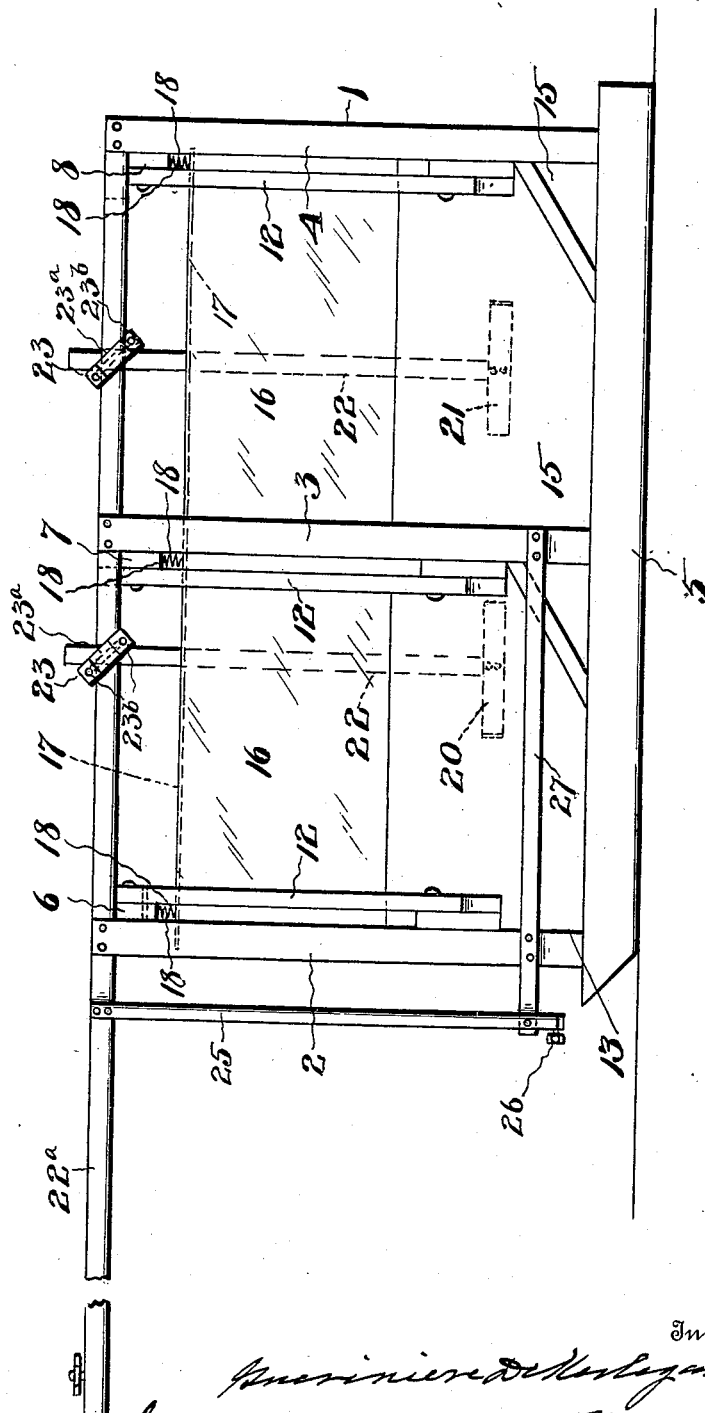
Figure 2:
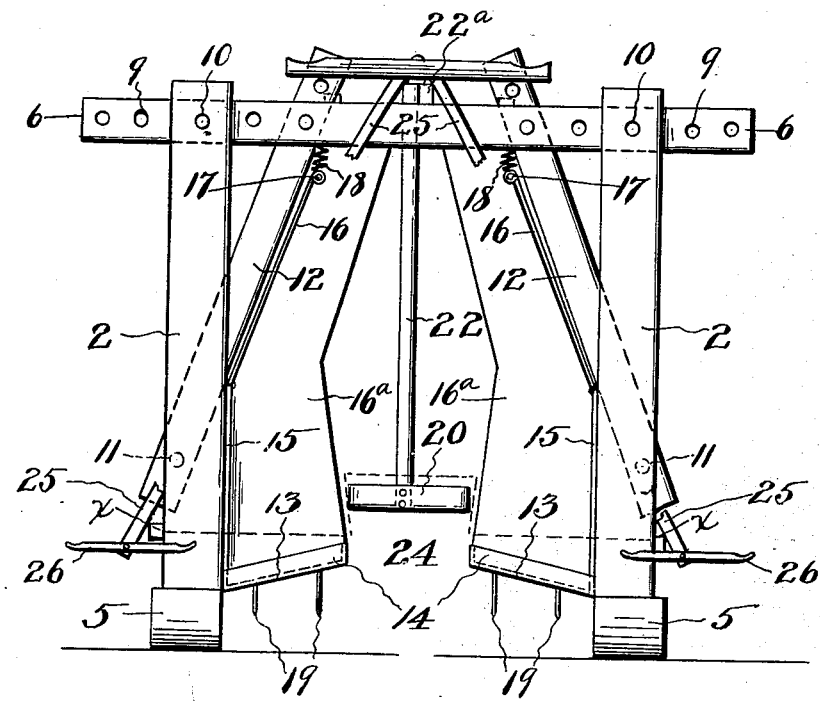
Figure 4:
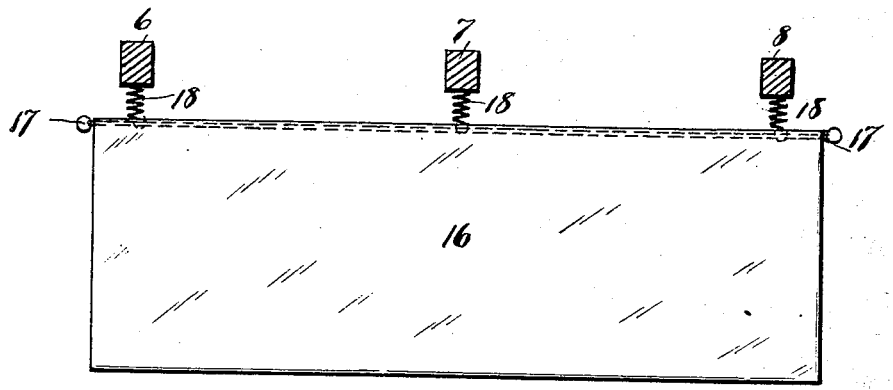

Referring to the drawings:—Figure 1 is a side elevation of my invention. Fig. 2 is a front elevation. Fig. 3, a horizontal section on the line $x-x$ of Fig. 2. Fig. 4, a detail side elevation of one of the covers and its supporting means. Fig. 5, a side elevation of one of the knocker blades on an enlarged scale.

In the drawings in which like reference characters denote like parts throughout the several views, 1 designates the frame of the device which is provided with three uprights 2, 3 and 4 on each side supported on runners 5. Horizontally disposed bars 6, 7 and 8 connect the tops of the three sets of bars 2, 3 and 4, said bars each being provided with holes 9 at opposite ends to receive bolts 10 to admit of adjustment. Each of the uprights 2, 3 and 4, on each side, is pivoted by means of a bolt 11 to a brace 12, the upper ends of each of said braces being secured to one of the horizontal bars 6, 7 and 8 on which they are adjustable. It will thus be seen that the receptacles can be adjusted by means of the uprights and braces to accommodate rows of varying width and height.

An insect receptacle 13, made of sheet iron or other suitable material, is mounted on and extends inwardly and upwardly from each of the runners 5 on opposite sides of the device and is provided with an upwardly extending rim 14 at the ends and one side, or front, while the other side, or back, has an upwardly extending wall 15. The inner edges of the insect receptacles converge from front to rear of the device, so that the space between them at the rear end is much smaller than the space at the front end, and the front portions of the receptacles are rounded for the purpose of facilitating the entering of the plants. A cover 16, which also acts as a deflector for the insects, is attached to the upper portion of each wall 15 and extends upward and its upper end is hung or mounted on a rod 17 suspended from horizontal bars 6, 7 and 8 by means of spiral springs 18 or other suitable resilient devices.

The spiral springs are designed to keep the covers taut and to allow for the different adjustments of the frame.

16ª is a cover at the rear of the device to prevent the insects from getting out.

Harrow teeth 19 are provided on the underside of the insect receptacle for the purpose of killing any grass growing between the rows of cotton or other vegetation.

Rigid knocker blades 20 and 21 are provided, each having a depending supporting arm 22 mounted adjustably on a horizontal top bar 22ª, by means of U-shaped clamps 23, having screw-threaded ends, said ends passing through a plate 23ª and being provided with screw nuts 23ᵇ, said knocker blades being arranged to extend diagonally across the entire space 24 between the insect receptacles and as the device moves forward knocks the plants and bends them over the receptacles and shakes the insects into the same and the receptacles being filled with coal oil water or other suitable liquid, the insects are killed or destroyed. The ends of the knocker blades terminate in the vertical planes of the inner edges of the insect receptacles for the purpose of allowing sufficient space for the plants to slide off the ends of said blades. The number of blades may be increased or diminished at will to suit the requirements of the work being done and their size regulated to accommodate the several adjustments of the frame.

25 are arms on which swingletrees 26 are pivoted, said arms each having its upper portion bolted to the top horizontal bar 22ª and its lower portion bolted to a horizontal bar 27, each of said horizontal bars 27 being bolted to uprights 2 and 3.

In operation the device is placed over and astride a row of plants so that it straddles the same and as it is drawn or propelled forward by horse or other power, the plants will come in contact with the blade 20 and slide inward on the same and be knocked or agitated and bent over to the left over the left hand insect receptacle and will shake the insects into the same, and when the plant is freed from the end of the blade it will be thrown over to the right and shake the insects into the right hand receptacle, then the plant will contact with the second blade 21 and slide outward on the same and be knocked or agitated and bent over to the right over the right hand insect receptacle and will shake the insects into the same and when the plant is freed from the end of the blade it will be thrown over to the left and shake the insects into the left hand receptacle. The plants are placed under pressure by contact with the blades and remain so until they slide off or are released from the ends of said blades and consequently are released under pressure.

I do not wish to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

What I claim is:—

1. In a device of the character set forth, comprising longitudinally extending and transversely spaced insect receptacles and non-resilient means for positively guiding and forcing the plants laterally over the receptacles and releasing them under pressure, comprising depending rigid arms having diagonal oppositely extending rigid blades thereon extending across said space both ends being free and located above the receptacles and the ends of said rigid blades terminating in the vertical planes of the inner edges of said receptacles to allow sufficient space for the plants to slide off the ends of the same, substantially as described.

2. In a device of the character set forth, a frame, insect receptacles on opposite sides thereof; flexible covers for each of said receptacles and spring means for securing said covers to the frame, substantially as described.

3. In a device of the character set forth, a frame, insect receptacles mounted on adjustable uprights and having covers secured to the frame by means of springs, said receptacles being spaced apart from each other, adjustable arms depending vertically from said frame and having stationary blades at their lower ends which extend diagonally across the space between the said receptacles, substantially as described.

In testimony whereof I affix my signature in the presence of two witnesses.

GUERINIERE DE KERLEGAND.

Witnesses:
 Jos. H. BLACKWOOD,
 EDWARD W. HOLMES.

---

Copies of this patent may be obtained for five cents each, by addressing the "Commissioner of Patents, Washington, D. C."